Patented July 25, 1950

2,516,145

UNITED STATES PATENT OFFICE 2,516,145

SYNTHESIS OF N-CARBOANHYDRIDES OF ALPHA-AMINO ACIDS

William W. Prichard, Wilmington, Del., assignor to E. I. du Pont de Nemours & Company, Wilmington, Del., a corporation of Delaware No Drawing. Application October 7, 1947, Serial No. 778,457

12 Claims. (Cl. 260—307)

This invention relates to the N-carboanhydrides of alpha-amino acids. More particularly, it relates to a new process for their preparation.

The N-carboanhydrides of alpha-amino acids have been known for a long time. They have the general formula

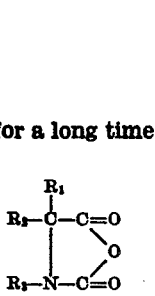

wherein the R's are hydrogen or monovalent organic radicals. One of the most interesting properties of these compounds is that they are able to condense, with evolution of carbon dioxide, to give polymeric materials containing the residue of the original alpha-amino acid. Under specific conditions, the intermolecular condensation of the N-carboanhydrides leads to solvent-soluble, high molecular weight polyamides capable of being shaped into films, fibres, etc.

Utilization of the N-carboanhydrides of alpha-amino acids has heretofore been prevented by the lack of a satisfactory method for their synthesis. One of the best reported methods is that of Leuchs [Ber. 39, 857 (1906)]; see also Leuchs and Geiger [Ber. 41, 1721 (1908)], wherein thionyl chloride is reacted with an N-carboalkoxy derivative of the amino acid, whereupon the N-carboanhydride forms with evolution of alkyl chloride. This method has the disadvantage of requiring the preparation and isolation of the N-carboalkoxy derivative, which is made by reacting the amino acid with a chlorocarbonic ester, e. g., methyl chlorocarbonate, or, preferably, benzyl chlorocarbonate. Chlorocarbonic esters are expensive chemicals and, moreover, they are not commercially available except on a small scale. There was thus a need for an inexpensive, synthetic method making use of commercially available chemicals.

An object of this invention is to provide a new method of preparing the N-carboanhydrides of alpha-amino acids. Another object is to provide a method whereby N-carboanhydrides of alpha-amino acids may be prepared in good yields from inexpensive and available reactants. Another object is to provide a method whereby the N-carboanhydrides may be prepared directly from the amino acids without the necessity of isolating intermediate compounds. Other objects will appear hereinafter.

These objects are accomplished by the process which comprises reacting, under anhydrous conditions, thionyl chloride with the dialkali metal salt of an alpha-carboxy-aminocarboxylic acid.

Taking phenylalanine as an example, the process is represented by the equation:

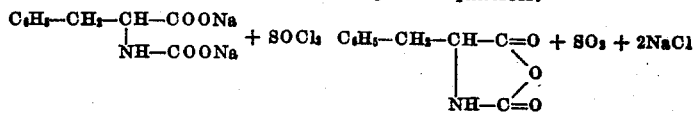

Indirect evidence of the existence of alkali metal salts of alpha-carboxyaminocarboxylic acids is found in the literature [e. g., J. Biol. Chem. 112, 723 (1936)], but these salts have not been isolated or used in chemical synthesis.

In its preferred embodiment, the process of this invention is carried out by treating a suspension of an alpha-amino acid in an anhydrous diluent which is a solvent for the alkali metal salt of an amino acid, such as methanol, with a sodium alkoxide, and then with carbon dioxide to form the disodium salt of the alpha-carboxyaminocarboxylic acid. The disodium salt precipitates out of the solvent, which is then replaced by another solvent, e. g., benzene, non-reactive toward thionyl chloride. Without isolating the disodium salt, the suspension is treated with thionyl chloride, whereupon the N-carboanhydride forms and goes into solution with subsequent evolution of sulfur dioxide and precipitation of sodium chloride. The sodium chloride is filtered off and the N-carboanhydride is isolated from its solution by appropriate means.

The invention is illustrated by the following examples, in which parts are by weight unless otherwise indicated.

Example I

A suspension of 2 parts of DL-beta-phenylalanine in 22 parts of anhydrous methanol was treated with a methanol solution containing 0.00408 mole of sodium methylate per cc. of solution, this solution being added in an amount equivalent to 2 moles of sodium methylate per mole of amino acid. A clear solution resulted, which was cooled to 5° C. and shaken vigorously under a slight pressure (2 mm. Hg) of carbon dioxide until no more carbon dioxide was absorbed. A precipitate of the disodium salt of 2-carboxyamino-3-phenylpropionic acid formed. The suspension was then heated to 65° C. and benzene vapor was distilled through it until the refractive index of the distillate was the same as that of benzene, indicating complete removal of the methanol. The solution, which then weighed about 40 parts, was diluted with 25 parts of methylene chloride, cooled to 5° C., and treated with 2 parts of thionyl chloride with good stirring. As the reaction mixture was allowed to warm to room temperature, a sudden, slightly exothermic reaction set in and the suspended material dissolved, giving a clear, light-yellow solution. After 15 minutes' stirring at room temperature, a precipitate of sodium chloride began to form. The solvent was then removed at room temperature under reduced pressure; the light-yellow solid residue was taken up in hot methylene chloride; and the sodium chloride was removed by filtration. The methylene chloride was replaced by benzene and the solution was cooled, whereupon 1.16 parts of fine crystals, melting at 128° C. with decomposition, was obtained. This was the N-carboanhydride of phenylalanine. A second crop of 0.25 part resulted from the addition of petroleum ether to the benzene filtrate. The yield was 61% of theory, based on the phenylalanine.

*Example II*

A suspension of 3.87 parts of l-leucine in 17 parts of anhydrous methanol was treated with a methanol solution of sodium methylate containing 0.00408 mole of sodium methylate per cc. of solution (2 moles per mole of amino acid), then with carbon dioxide as described in the preceding example. The methanol was removed from the suspension of the disodium salt of 2-carboxy-amino-4-methylvaleric acid by distilling benzene through it. The resulting alcohol-free suspension, which amounted to about 25 parts, was diluted with 25 parts of methylene chloride, cooled to −20° C., and treated slowly with stirring with 5 parts of thionyl chloride. On warming the suspension to room temperature, almost all of the suspended material went into solution. This was followed shortly by precipitation of sodium chloride. The solvent was removed under reduced pressure at room temperature; the light-yellow solid residue was taken up in dry ether, and the sodium chloride was removed by filtration. The ether solution was diluted with petroleum ether and cooled in an ice-salt mixture. The crystalline deposit which formed was filtered and recrystallized from dry cyclohexene. The N-carboanhydride of l-leucine was thus obtained (yield 20% of theory) as platelets melting at 72° C. with decomposition.

*Example III*

The sodium salt of 1-aminocyclohexanecarboxylic acid [see Ber. 39, 1728 (1906)] was prepared by hydrolyzing 5,5-pentamethylenespirohydantoin,

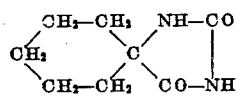

with sulfuric acid, neutralizing the resulting amino acid sulfate with sodium hydroxide, extracting the sodium salt of the amino acid with methanol, and recrystallizing it from n-butanol. The neutralization equivalent of the sodium salt was 165.4, as compared with the calculated value of 165.1.

Four parts of the sodium salt of 1-aminocyclohexanecarboxylic acid was dissolved in 15 parts of methanol and this solution was treated with a methanol solution of sodium methoxide containing 0.00408 mole per cc., used in amount of 1 mole per mole of the sodium salt. The resulting solution was cooled to 0° C. and saturated with carbon dioxide. The methanol was removed by distilling benzene through the solution and the resulting suspension of disodium 1-carboxyaminocyclohexanecarboxylate was diluted with an equal volume of methylene chloride. The suspension, which now contained 100 parts of solvent, was cooled to 0° C. and treated with 3.3 parts (about 10% more than the theoretical amount) of thionyl chloride. As the suspension was allowed to warm to room temperature, the solid dissolved. The clear, yellow solution was stirred at room temperature for 15 minutes, during which time a precipitate of sodium chloride formed. The salt was filtered off and the excess thionyl chloride and solvent removed under reduced pressure. The residual N-carboanhydride of 1-aminocyclohexanecarboxylic acid (1.4 parts) was recrystallized from methylene chloride. It melted at 110–112° C. with decomposition.

*Example IV*

A suspension of 2 parts of 2-amino-4,6,6-trimethyl-heptanoic acid in 25 parts of methanol was treated with sodium methoxide (2 moles per mole of amino acid) as in the preceding examples. The resulting clear solution was cooled to 0° C. and saturated with carbon dioxide, whereupon a crystalline precipitate of disodium 2-carboxyamino-4,6,6-trimethylheptanoate formed. The methanol was removed by distilling benzene vapor through the suspension, and the resulting benzene suspension was concentrated to a total weight of 100 parts. Thionyl chloride (1.68 parts or 1.3 times the calculated amount) was added at 10° C. and the suspension was warmed to 25° C., at which temperature the suspended solid dissolved. The clear yellow solution was warmed to 75° C. A vigorous evolution of gas occurred and sodium chloride precipitated. The mixture was diluted with 200 parts of petroleum ether and the crystalline precipitate was filtered off and extracted with methylene chloride. On diluting the extract with petroleum ether, white crystals precipitated which were filtered and dried. This material (0.56 part) was the N-carboanhydride of 2-amino-4,6,6-trimethylheptanoic acid, M. P. 112–113° C. with decomposition.

The amino acid used in this example was prepared by hydrolysis of 2,4,4-trimethylpentyl hydantoin as follows: To a solution of 142 parts (one mole) of 3,5,5-trimethylhexanal in 600 parts of ethanol was added a solution of 60 parts (1.12 moles) of ammonium chloride in 180 parts of water. As the reaction mixture was stirred at 15° C., 51.5 parts (one mole) of 95% sodium cyanide was added during a half-hour period. The reaction mixture was then stirred at room temperature for 3 hours; 250 parts (2.2 moles) of ammonium carbonate was added; and stirring was continued at 55–60° C. for 4 hours. The excess ammonium carbonate was decomposed at steam-bath temperature; the reaction mixture was repeatedly concentrated and cooled until no further precipitate formed; and the crude hydantoin was filtered off at each stage. Crude product was purified by dissolving it in 5% sodium hydroxide and acidifying and recrystallization from alcohol-water. 5-(2,4,4-trimethyl)-pentylhydantoin melts at 189–190° C. It was hydrolyzed by refluxing for 2 days with 60% sulfuric acid, then diluting with water and adding 20% ammonium hydroxide until a pH of 6 was reached, whereupon the amino acid precipitated. It was purified by dissolving it in 5% sodium hydroxide and acidifying. Recrystallization from hot water gave pure 2-amino-4,6,6-trimethylheptanoic acid, M. P. 228–230° C. with decomposition.

The process of this invention is applicable to the dialkali salts of alpha-carboxyaminocarboxylic acids derived from any alpha-aminocarboxylic acid having at least one hydrogen atom on the nitrogen. However, it is preferable to use amino acids which are free from groups reactive with thionyl chloride under the reaction conditions, e. g., hydroxyl, thiol, or additional amino groups, since complicating side reactions may take place with these starting materials. The preferred reactants are those alpha-amino acids which, apart from the carboxyl and amino groups, are hydrocarbon. Additional examples of the preferred amino acids are glycine, N-methylglycine, N-phenylglycine, alanine, valine, isoleucine, proline, and the like.

The preferred reactants have the formula

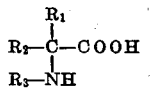

where the R's are selected from hydrogen and hydrocarbon radicals and two of the R's may be connected to form a cyclic structure. The dialkali metal salts can be represented by the formula

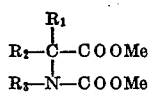

where the R's are as aforesaid and Me is an alkali metal. Included among these preferred hydrocarbon alpha-monoamino-monocarboxylic acids are those having the formula

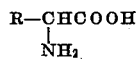

where R is hydrocarbon. Thus R can be alkyl, aryl, aralkyl, cycloalkyl or other hydrocarbon radical, preferably aliphatically saturated. Their dialkali metal salts can be represented by the formula

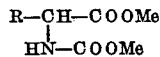

where R is as aforesaid and Me is an alkali metal.

The dialkali salts (e. g., potassium, sodium, or lithium salts) are preferably prepared by the method illustrated in the examples, i. e., treatment of the amino acid in an anhydrous diluent which dissolves the alkali salt of the amino acid, e. g., an alcohol of 1 to 4 carbon atoms such as methanol, ethanol, propanol, or butanol, with an alkali alkoxide, which may be made from the same or a different alcohol. This method avoids the isolation of the salts which would be necessary if the salts were prepared in aqueous solution, e. g., by reacting carbon dioxide with amino acids in alkaline aqueous systems. By using the alkali alkoxides it is necessary only to replace the alcohol diluent by one which is non-reactive towards thionyl chloride. Such a diluent, which must be anhydrous and is preferably a volatile one boiling below 150° C., may be any of the hydrocarbon solvents such as hexane, octane, cyclohexane, benzene, toluene, etc., or a halogenated hydrocarbon such as methylene chloride, chloroform, carbon tetrachloride, tetrachloroethane, etc., or an ether such as diethyl ether, dibutyl ether, etc. Alternatively, if the dialkali salt is isolated, the reaction may be carried out without diluent by treating the dry salt with thionyl chloride, preferably in excess to insure fluidity and preferably with good cooling. However, a diluent is preferable in any case to prevent too vigorous a reaction. Instead of starting with the amino acid itself to form the dialkali salt of the alphacarboxyaminocarboxylic acid, it may be preferable in some cases to start with the preformed alkali salt of the amino acid. This is illustrated in Example III.

The reaction between thionyl chloride and the dialkali salt of the alpha-carboxyaminocarboxylic acid proceeds readily and, in general, does not require external heat. On the contrary, it is often desirable to operate at low temperatures, e. g., between −50° and 0° C., and to complete the reaction at room temperature, i. e., 15–25° C., although in some cases higher temperatures, up to about 100° C., may be used.

The thionyl chloride is preferably used in excess, which may be moderate, e. g., 5–50%, or may be considerably in excess, e. g., up to 500%, to insure complete reaction of the more expensive reactant, viz., the amino acid. The reaction is continued until there is no further appreciable gas evolution or precipitation of alkali chloride from the reaction mixture, although it may be desirable to continue it beyond this point, with external heating if necessary.

If desired, the dialkali metal salts of the alpha-carboxyaminocarboxylic acids may be isolated prior to reaction with thionyl chloride. This is done most conveniently by dissolving one mole of the amino acid and 2 moles of alkali methoxide in the least possible amount of dry methanol (e. g., 6 or 7 parts per part of amino acid in the case of phenylalanine) and saturating the solution with carbon dioxide. The salt crystallizes out of the methanol as hard, white crystals, soluble in water and alcohols and insoluble in the common, non-polar solvents such as benzene, ether, or petroleum ether. These salts are stable under ordinary conditions. They decompose and burn without melting. For example, disodium 1-carboxyaminocyclohexanecarboxylate,

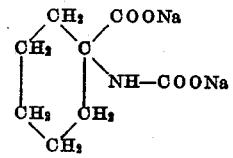

is a white, crystalline solid showing on analysis C, 41.26%; H, 4.77%; N, 5.19%; Na, 20.02%, as compared with the calculated values, C, 41.5%; H, 4.76%; N, 6.06%; Na, 19.9%. Similarly, disodium 2-carboxyamino-4-methylvalerate,

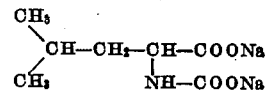

is a white, crystalline solid showing on analysis N, 5.94%, and Na, 20.9%, as compared with the calculated values of N, 6.39%, and Na, 21.0%.

The N-carboanhydrides of the alpha-amino acids are, in general, readily soluble in organic solvents and they will be present in the liquid phase of the reaction system, or, if not, they can be dissolved by adding an appropriate solvent. It is thus necessary only to remove the solid alkali chloride by filtration or centrifugation, and to evaporate the solvent from the filtrate, preferably under reduced pressure. The N-carboanhydride is thus obtained in a state of purity sufficient for most purposes. If desired, however, it can be recrystallized from an appropriate solvent, as illustrated in the examples. In isolating and purifying the carboanhydrides, it is important to operate under anhydrous conditions, in view of the known sensitivity of these compounds to water.

As many apparently widely different embodiments of this invention may be made without departing from the spirit and scope thereof, it is to be understood that this invention is not limited to the specific embodiments thereof except as defined in the appended claims.

I claim:

1. A method for preparing N-carboanhydrides of alpha-amino acids which comprises reacting, under anhydrous conditions, thionyl chloride with the dialkali metal salt of a hydrocarbon alpha-carboxyaminocarboxylic acid.

2. A method for preparing N-carboanhydrides of alpha-amino acids which comprises reacting, under anhydrous conditions, thionyl chloride with the disodium salt of a hydrocarbon alpha-carboxyaminocarboxylic acid.

3. A method for preparing N-carboanhydrides of alpha-amino acids which comprises treating an alpha-amino acid having, as the only reactive groups, an amino group and a carboxyl group and having at least one hydrogen atom on the nitrogen, in an anhydrous solvent, with an alkali metal alkoxide and with carbon dioxide thereby forming the dialkali metal salt of the alpha-carboxyaminocarboxylic acid, and reacting, under anhydrous conditions, thionyl chloride with said dialkali metal salt of the alpha-carboxyaminocarboxylic acid.

4. A method for preparing N-carboanhydrides of alpha-amino acids which comprises reacting, under anhydrous conditions, thionyl chloride with the dialkali metal salt of a saturated alpha-carboxyaminocarboxylic acid having, as the only groups reactive with thionyl chloride, one carboxyamino group and one carboxyl group.

5. A method for preparing N-carboanhydrides of alpha-amino acids which comprises reacting, under anhydrous conditions, thionyl chloride with the disodium salt of a saturated alpha-carboxyaminocarboxylic acid having, as the only groups reactive with thionyl chloride, one carboxyamino group and one carboxyl group.

6. A method for preparing N-carboanhydrides of alpha-amino acids which comprises reacting, under anhydrous conditions, thionyl chloride with the disodium salt of an alpha-carboxyaminocarboxylic acid which is saturated hydrocarbon except for one carboxyamino and one carboxyl group.

7. A method for preparing N-carboanhydrides of alpha-amino acids which comprises reacting, under anhydrous conditions, thionyl chloride with the dialkali metal salt of an alpha-carboxyaminocarboxylic acid having hydrogen on the nitrogen of the carboxyamino group and having, as the only groups reactive with thionyl chloride, one carboxyamino group and one carboxyl group.

8. A method for preparing N-carboanhydrides of alpha-amino acids which comprises reacting, under anhydrous conditions, thionyl chloride with the dialkali metal salt of N-carboxyleucine.

9. A method for preparing N-carboanhydrides of alpha-amino acids which comprises reacting, under anhydrous conditions, thionyl chloride with the disodium salt of N-carboxyleucine.

10. A method for preparing N-carboanhydrides of alpha-amino acids which comprises reacting, under anhydrous conditions, thionyl chloride with the dialkali metal salt of N-carboxyalanine.

11. A method for preparing N-carboanhydrides of alpha-amino acids which comprises reacting, under anhydrous conditions, thionyl chloride with the dialkali metal salt of an alpha-carboxyaminocarboxylic acid free from hydrogen on the nitrogen of the carboxyamino group and having, as the only groups reactive with thionyl chloride, one carboxyamino group and one carboxyl group.

12. A method for preparing N-carboanhydrides of alpha-amino acids which comprises reacting, under anhydrous conditions, thionyl chloride with the dialkali metal salt of N-carboxy-N-methylglycine.

WILLIAM W. PRICHARD.

No references cited.